INVENTORS
EMANUEL GIL-AV
BINYAMIN FEIBUSH
BY
OSTROLENK, FABER, GERB & SOFFEN
ATTORNEYS

United States Patent Office 3,494,105
Patented Feb. 10, 1970

3,494,105
GAS CHROMATOGRAPHIC RESOLUTION OF ENANTIOMERS BEARING AN AMINO GROUP
Emanuel Gil-Av, Rehovoth, Israel, and Binyamin Feibush, Dayton, Ohio, assignors to Yeda Research and Development Co., Ltd., Rehovoth, Israel, a company of Israel
Filed Sept. 18, 1967, Ser. No. 689,211
Claims priority, application Great Britain, Sept. 16, 1966, 41,512/66
Int. Cl. B01d *15/08*
U.S. Cl. 55—67           10 Claims

ABSTRACT OF THE DISCLOSURE

Gas chromatographic resolution of enantiomers having an —NH— group linked to an asymmetric carbon atom or to an atom in α-position to an asymmetric carbon atom, using as stationary phase N-acylated polypeptide esters with at least two asymmetrical carbon atoms, carbonyl-bis (amino acid ester) derivatives with at least two asymmetric carbon atoms, or α-amino acid amides with at least one asymmetric carbon atom in which either of the amino and amido groups may be acylated.

---

The present invention relates to a method for the resolution of enantiomers by gas-liquid partition chromatography on an optically active stationary phase.

The resolution of enantiomers by gas-liquid partition chromatography on an optically active stationary phase has presented a challenge to workers in the field for many years. However, all efforts remained fruitless, and some successes claimed in the literature could not be reproduced.

It has already been suggested to resolve enantiomers by gas-liquid partition chromatography on an optically active stationary phase, using as stationary phase N-trifluoroacetyl derivatives of various monomeric α-amino acid esters (see Tetrahedron Letters, No. 10, pages 1009–1015 (1966)). Indeed, in accordance with that method, the resolution of certain enantiomers from the same group as the stationary phase, i.e. N-trifluoroacetyl derivatives of α-amino acid esters, could be shown to have taken place but the resolution factor, defined as the retention volume of the enantiomer emerging last over that of the enantiomer emerging first, was to low for preparative purposes. Also, only a restricted group of enantiomers could be resolved.

It is the object of the present invention to provide an improved method for the resolution of enantiomers by gas-liquid partition chromatography by which a broader range of enantiomers can be resolved with resolution factors useful both for analytical and preparative purposes.

The invention consists in a process for the resolution of enantiomers being members of the group of compounds having an —NH— group linked to an asymmetric carbon atom or to an atom in α-position to an asymmetric carbon atom, comprising passing a vaporized mixture of enantiomers in a manner known per se through a column adapted for gas-liquid partition chromatography whose stationary phase comprises at least one compound selected from the group consisting of:

(a) Compounds with at least one asymmetric carbon atom of the general formula

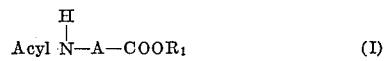

(I)

in which Acyl stands for an acyl radical, $R_1$ is the radical of an esterifying alcohol $R_1OH$ and A is a radical formed from at least two peptidically condensed natural or synthetic amino acids which together with the terminal amino and carboxylic groups form a polypeptide of the formula $NH_2$—A—COOH;

(b) Compounds with at least two asymmetric carbon atoms of the general formula

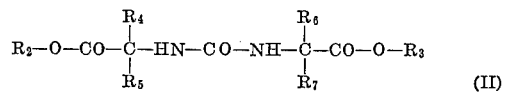

(II)

in which $R_2$ is the radical of an esterifying alcohol $R_2OH$, $R_3$ is the radical of an esterifying alcohol $R_3OH$, and each of $R_4$ through $R_7$ is hydrogen or a hydrocarbon radical which may, if desired, be substituted, with the proviso that $R_4$ is different from $R_5$ and $R_6$ is different from $R_7$;

(c) α-amino acid amides with at least one asymmetric carbon atom in which either of the amino and amido groups may be acylated; and separately recovering the optical antipodes emerging from the discharge end of the column.

The resolution of enantiomers in accordance with the invention is applicable both for analytical and preparative purposes. For analytical purposes a capillary column having its inner surface coated with the stationary phase will as a rule be preferred. Such capillary columns may in some cases have to be as long as 70 meters, or even more. For preparative purposes a comparatively short packed column is needed. The preparative resolution of enantiomers in accordance with the invention is of special value in the production of optically active fine chemicals and pharmaceuticals.

The compounds which in accordance with the present invention are used as stationary phase and which correspond to the above Formula I are N-acylated polypeptide esters. In general these compounds are known and they can be prepared by any of the various known methods for their preparation. The following procedure is given by way of example:

50 mmole of an α-amino acid ester hydrochloride is dissolved in 130 cc. of dry chloroform and the solution is cooled to 0° C. 55 mmole of triethyleneamine is added to the solution. A second solution is prepared by dissolving 50 mmole of N-carbobenzoxy-α-amino acid in 110 cc. of dry chloroform and this solution, too, is cooled to 0° C. The two solutions are admixed and 55 mmole of dicyclohexylcarbodiimine is added, the reaction mixture is left at room temperature overnight. Any precipitate formed is filtered off and the filtrate washed thrice with a 1% aqueous HCl solution, then with water and thereafter thrice with 5% aqueous $NaHCO_3$ solution. The solution is then dried over anhydrous magnesium sulphate, filtered and the chloroform si evaporated in vacuo. The residue is taken up in ether, any undissolved matter is filtered off and the ether is evaporated in vacuo. The residue is dissolved in a small amount of ether and the resulting solution is diluted with pentane and left overnight in a refrigerator. There is obtained a precipitate of N-carbobenzoxy dipeptide ester.

10 g. of the above ester is dissolved in 100 cc. of absolute ethanol and a few drops of acetic acid and 0.4 g. of 10% palladium on charcoal is added whilst stirring. Hydrogenation is carried out in a conventional apparatus at 50 p.s.i. for 12 hours, the catalyst is filtered off and HCl is added until the solution becomes acidic. The ethanol is then evaporated in vacuo to dryness. Ether is added to the residue and there is obtained a hydroscopic material in the form of a gel which crystallizes overnight. The supernatent ether is filtered off, and the crystals are washed with dry ether. In this manner a dipeptide ester hydrochloride is obtained.

To the above hydrochloride methylene chloride is added and the mixture is cooled by means of liquid air to about —40° C. whereupon trifluoroacetic acid anhydride (1 cc./g. of hydrochloride) is added. The mixture is allowed to warm up to room temperature while stirring and stirring is continued overnight. Thereafter the solvent is evaporated, the residue dissolved in ether and washed thrice with a 1% aqueous HCl solution, again with water and thereafter three times with a 5% aqueous sodium bicarbonate solution. The solution is dried over anhydrous magnesium sulphate, filtered and the methylene chloride is evaporated in vacuo. The oil formed crystallizes on standing.

If desired, the dipeptide may be N-acylated with any other suitable acid.

Where it is desired to prepare an N-acyl-tripeptide ester, e.g. the N-trifluoroacetyl, the dipeptide ester hydrochloride obtained above is condensed with another mole of amino acid to obtain the corresponding tripeptide ester hydrochloride and this is then converted into the N-acyl, e.g. N-trifluoroacetyl derivative in the same manner as outlined above.

The following are examples of optically active stationary phase compounds of Formula I prepared in the above manner (TFA=trifluoroacetyl and val=valine radical):

(1) N-TFA-(L-val)$_2$-isopropyl ester.—M.P. 107–109°, $[\alpha]_D^{30}=-14.76°$ (4% in CHCl$_3$).

(2) N-acetyl-(L-val)$_2$-isopropyl ester.—M.P. 129–131.5°, $[\alpha]_D^{29}=-25.25°$ (5% in CHCl$_3$).

(3) N-TFA-(L-val)$_3$-isopropyl ester.—M.P. 202–4°, $[\alpha]_D^{30}=-74.1°$ (2.7% in CHCl$_3$).

(4) T-TFA-(L-val)$_2$-cyclohexyl ester.—M.P. 96–98°, $[\alpha]_D^{28}=-16.47°$ (5% in CHCl$_3$).

The compounds serving as optically active stationary phase which correspond to the above Formula II may be considered as carbonyl bis (amino acid ester) derivatives. Where the two amino acid residues are identical, a symmetric compound of Formula III is obtained

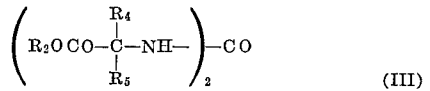

(III)

in which R$_2$, R$_4$ and R$_5$ have the same meaning as in Formula II. An example of such a compound is carbonyl-bis(L-valine-isopropyl ester),

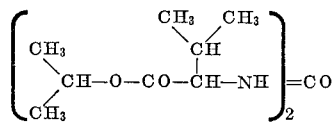

which can, for example, be obtained by the following procedure:

0.27 mole of L-valine isopropyl ester hydrochloride is dissolved in 400 cc. of dry dioxane, and 0.3 mole of triethylamine is added while cooling. 0.14 mole of phosgene in dry dioxane solution is added while maintaining the temperature at 0° C. The reaction mixture is stirred in the cold for one hour and then another 0.6 mole of eriethylamine is added. Stirring is continued at room temperature overnight, the precipitate is filtered off and from the filtrate the solvent is evaporated in vacuo. Ether and water are added to the mixture and HCl is added dropwise with vigorous stirring until the mixture becomes acidic. The mixture is then allowed to stratify and the phases are separated. The organic phase is washed first with water and then with a 5% aqueous NaHCO$_3$ solution. After drying over anhydrous magnesium sulphate the solvent is evaporated, the residue is taken up in some ether and reprecipitated by the addition of pentane. 3 g. of the desired compound are obtained. M.P. 113–114° C., $[\alpha]_D^{31}=+24.56°$ (5% in CHCl$_3$).

*Analysis.*—Calc.: C, 59.28%; H, 9.36%. Found: C, 59.23%; H, 9.42%.

Racemization of the compound proceeds comparatively slowly and after 154 hours at 120±5° C. the optical activity was still 84% of the original value. Also the IR spectrum after heating showed identity with that prior to heating. These findings indicate that the compound is sufficiently stable for serving as stationary phase in accordance with the present invention.

The enantiomers that can be resolved in accordance with the invention and which are all characterized by an —NH— group linked to an asymmetric carbon atom or to an atom in α-position to an asymmetric carbon atom are to be found, for example, among amino acids and their derivatives, amines, amino alcohols, heterocyclic compounds with a nuclear nitrogen in form of an —NH— group, and the like. The amino acids may be of the α-amino and β-amino series and be natural or synthetic. They are preferably resolved in the form of their N-acylated esters. The enantiometric amino alcohols that can be resolved in accordance with the invention may also be of the α- and β-series and be derived, for example, from natural or synthetic α- or β-amino acids. The amines may be unsubstituted or substituted primary or secondary and belong to the aliphatic, cycloaliphatic or aromatic series. The heterocyclic enantiomers may be of any type that has a nitrogen atom in form of an —NH— group linked to an asymmetric carbon atom, irrespective to the ring size and substitution and may comprise further hetero atoms. Any enantiomeric compounds to be resolved in accordance with the invention have to be vapourizable under the operational conditions.

The invention will now further be described with reference to some examples and to the accompanying drawings in which:

FIG. 5 is another graphic representation showing the temperature dependency of the resolution factor.

The capillaries used in the experiments of which the results are given hereinafter were drawn from Pyrex-glass tubing of 2.6 mm. I.D. and 6.35 mm. O.D. with an apparatus built according to instructions given in the literature (see, for example, Desty, D. H. Haresnape, J. N., and Whyman, B. H., Anal. Chem., 1960, 32, 302, and Kreyenbuhl, A., Bull. Soc. Chim. France, 1960, 2125). The columns were 50 to 100 metres long and had an internal diameter of about 0.25 mm. Prior to use, they were cleaned, successively, with a detergent solution, absolute ethanol, and absolute ether and then coated with a 20% ethereal solution of the optically active phase by the plug method. Drying and conditioning were effected while the temperature was raised gradually to 80° C. The preliminary treatment with a detergent serves for producing on the inner walls of the capillary a thin detergent film so as to ensure good adhesion and uniform distribution of the subsequently applied active phase. If no detergent base coat is applied, the surface tension of the active phase is liable to exceed the phase/glass adhesion with consequential rupture of the active phase layer and the formation of droplets.

Figure 1:
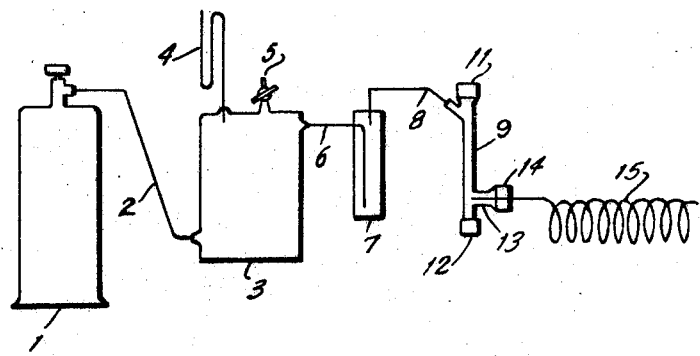
FIG. 1 is a diagrammatic illustration of an arrangement for preparing a coated capillary column for use in accordance with the invention.

For the cleaning and coating, an arrangement as illustrated in FIG. 1 was used. As shown, the arrangement comprises a nitrogen container 1 linked through a pipe 2 with a pressure regulator vessel 3 fitted with a manometer 4 and an Edwards high vacuum valve 5 for the fine pressure adjustment. Vessel 3 is linked through a pipe 6 with a drying vessel 7 filled with silica gel and vessel 7, in turn, is linked through a pipe 8 to a container 9 for the detergent or coating solution, as the case may be. Vessel 9 comprises a top plug 11 and a bottom plug 12, both of resilient material, e.g. rubber, for the insertion and withdrawal, respectively, of washing or coating solution by means of pointed injector and withdrawal means, e.g. a hypodermic injector. Vessel 9 further comprises a connector 13 fitted with a plug 14 for connection with the capillary 15. At first an alcoholic-aqueous detergent solution, e.g. a solution prepared from 15 g. of Tide (trade name; detergent preparation supplied by Procter & Gamble, U.S.A.) in a mixture of 135 cc. of water and 58 g. of 95% alcohol, is passed through the capillary. The total quantity of the solution is of the order of a few cc., e.g. 4 cc. Thereafter a similar volume of absolute alcohol is passed for drying the detergent film formed, and this is followed by the passage of a similar volume of ether. Finally, the capillary is flushed with nitrogen overnight. During the washing and flushing operations, vessel 7 may be linked directly to vessel 1. However, for the coating of a fine pressure adjustment is required and the pressure regulator vessel 6 has to be interposed between the reservoir 1 and vessel 7.

For the application of the stationary phase, a non-viscous solution of the optically active compound designated as stationary phase is prepared in a solvent of low surface tension. For example, a 20% ethereal solution of the stationary phase compound can be used provided, of course, the compound is ether-soluble and that the resulting solution is indeed of low viscosity. Approximately 1 cc. of the solution is injected into vessel 9 through plug 11 and the solution is carefully pushed into the capillary by applying a low nitrogen pressure, until the length of the filled portion is about 3 meters long. The surplus of the solution is withdrawn by suction by means of a hypodermic needle which is inserted through the bottom rubber plug 12, and vessel 9 is dried of any resdiual solution by flushing with nitrogen which is withdrawn through the hypodermic needle. The capillary is placed in its horizontal position and nitrogen is passed therethrough at the rate of 10 cc. per minute. After the liquid plug is discharged, the capillary is further flushed with dry nitrogen under the same pressure and at the same rate. The so-formed stationary phase film is then dried by raising the temperature gradually to 80° C. and the capillary column is then ready for use.

Figure 2:
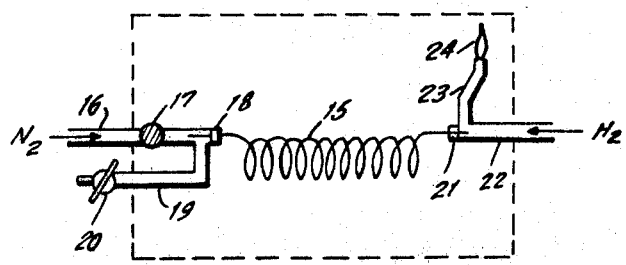
FIG. 2 is a diagrammatic illustration of a gas chromatograph used in accordance with the invention.

In the experiments whose results are given hereinafter a Perkin-Elmer Model 801 chromatograph modified for work with capillary columns and provided with a flame ionization detector was used. The temperature of the injector was about 200° and that at the column within the range of 90–140° C. The nitrogen pressure was 20 p.s.i. Samples were injected in ethereal solution (0.3 to 0.6 μl.) with a split ratio of about 1 to 100. Such a chromatograph is diagrammatically illustrated in FIG. 2.

As shown, the device comprises a nitrogen inlet pipe 16 with a plug 17 for the injection of the material to be gas-chromatographed, and a plug 18 for connection of the capillary 15. A second pipe 19 controlled by a valve 20 branches off from pipe 16. The unit 16, 19 thus acts as a distributor by which the nitrogen current with entrained material is distributed between column 15 and a vent (not shown) at a predetermined split ratio.

The discharge end of capillary 15 is connected through a plug 21 to a pipe 22 through which hydrogen is fed and which is fitted with a vent 23 leading to an ionization detector 24.

In the following examples N-trifluoroacetyl is abbreviated as N-TFA.

Example 1

Various N-TFA-(±)-alanine esters were resolved on N-TFA-(L-val)$_2$-isopropyl ester as stationary active phase, using a capillary column of 70 meters length and 0.25 mm. I.D. and a column temperature of 110° C. In each case two peaks were obtained and in the following Table I each peak is characterized by the relative retention volume, the reference substance being N-trifluoroacetyl-L-alanine methyl ester whose retention volume is defined as 1. In the third column of the table, the resolution factor $r_{2/1}$ is given.

TABLE I

[Relative retention volumes of various N-TFA-(±)-alanine esters on N-TFA-L-(val)$_2$-isopropylester as stationary phase]

| Ester | Peak 1 | Peak 2 | $r_{2/1}$ |
|---|---|---|---|
| Methy | 0.929 | 1.000 | 1.076 |
| Ethyl | 1.220 | 1.345 | 1.10 |
| n-Propyl | 2.087 | 2.304 | 1.10 |
| t-Butyl | 1.355 | 1.643 | 1.21 |
| n-Butyl | 3.574 | 3.954 | 1.11 |
| Cyclopentyl | 7.446 | 8.412 | 1.13 |

Taking, for example, the $r_{2/1}$ of the t-butyl ester, it is seen that the value is 1.21. In comparison, the resolution factor for the same enantiomeric mixture over the monomeric acid derivative N-TFA-L-isoleucine-n-dodecyl ester is only 1.039.

Figure 3:
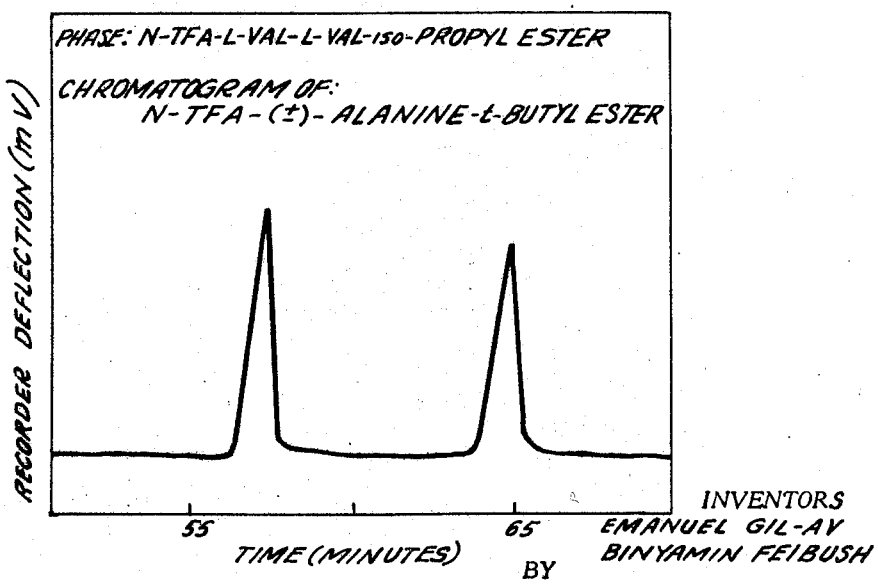
FIGS. 3 and 4 are graphic representations showing the resolution of N-trifluoroacetyl-(±)-alanine-t-butyl ester.
Figure 3:
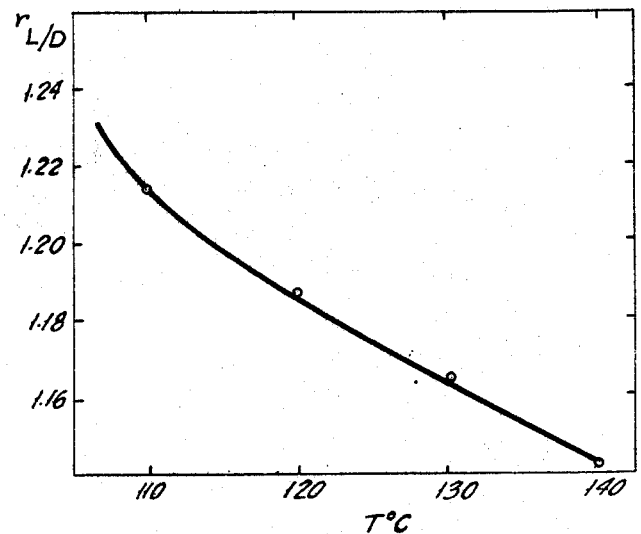

In the diagrammatic representation of FIG. 3 the resolution of the t-butyl ester into two substantially equal peaks signifying the two enantiomers is clearly seen. In the figure the deflection of the recorder in millivolts is plotted against time.

Example 2

Using a capillary column of 70 meters length and 0.25 mm. I.D. and a column temperature of 139° C., various N-TFA-(±)-alanine esters were resolved on N-acetyl-(L-val)$_2$-isopropyl ester as stationary active phase and the results are given in the following Table II in which the peaks are characterized by their retention volumes.

TABLE II

[Retention volumes of various N-TFA-(±)-alanine esters on N-acetyl-(L-val)$_2$-isopropyl ester]

| Ester | Peak 1 | Peak 2 | $r_{2/1}$ |
|---|---|---|---|
| n-Propyl | 15.0 | 16.35 | 1.900 |
| t-Butyl | 9.75 | 11.03 | 1.131 |
| n-Butyl | 24.3 | 26.5 | 1.095 |
| Cyclopentyl | 50.1 | 54.9 | 1.096 |

Example 3

Using the same stationary active phase as in Example 2, the methyl and isopropyl esters of N-acetyl-alanine were resolved with the following results:

TABLE III

| Ester | Peak 1 | Peak 2 | $r_{2/1}$ |
|---|---|---|---|
| Methyl | 30.75 | 32.35 | 1.052 |
| Isopropyl | 38.5 | 42.5 | 1.104 |

Example 4

Using the same stationary active phase and column as in Example 1, N-TFA-O-isobutyrile-(±)-valinolate (an amino alcohol derivative) was resolved with a resolution factor of 1.14 at a temperature of 110° C.

Example 5

A Perkin-Elmer Model 801 chromatograph with a column of 2 m. length and 1 mm. I.D. at a temperature of 100° C. and a nitrogen pressure of 2 atmospheres was used. The column was packed with 5% N-TFA-(L-val)$_2$-cyclohexyl ester on Chromosorb W (trade name; supplied by Applied Science Laboratories, State College, Pa. U.S.A.). In a preliminary run the enantiomeric mixture was passed for identification at 125° C. through a 4 m. long column with 4 mm. I.D. packed with SE–30 (trade name; silicon material supplied by General Electric Co.) and the effluent was identified by means of I.R. and NMR spectra.

Figure 4:
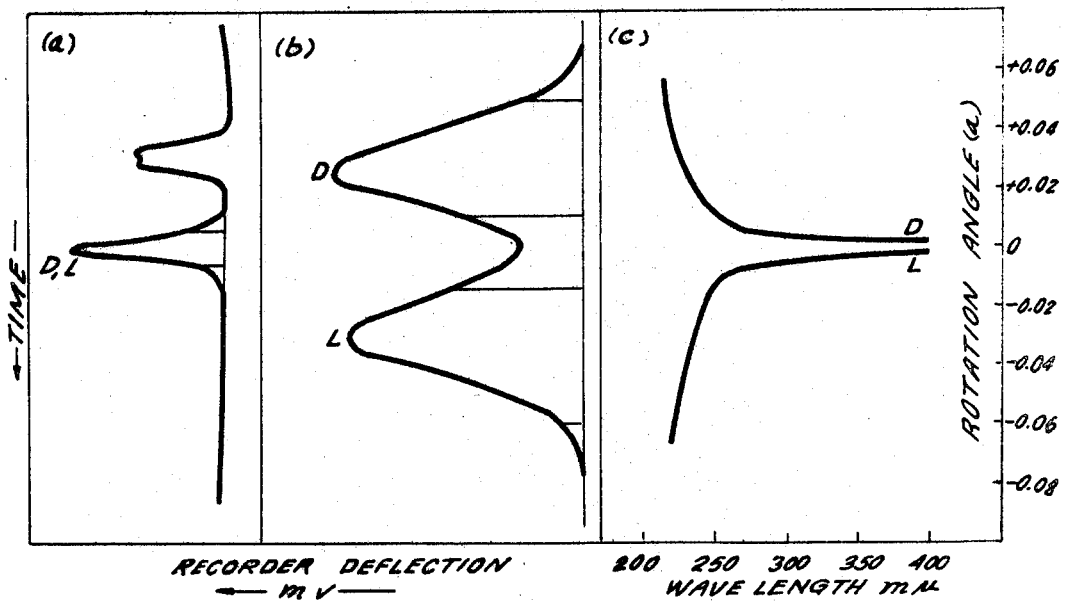

The results of the preliminary experiment and the resolution are shown in the diagram of FIG. 4. Part a of the figure shows the recorder deflection plotted against time in the preliminary identification run and the shaded peak designates the pure racemate. Part b gives the results of the resolution by means of the stationary active N-TFA-(L-val)₂-cyclohexyl ester phase. The recorder deflection is again plotted against time and two distinct, substantially equal peaks are clearly seen. Finally, part c of FIG. 4 is an optical rotation diagram in which the rotation angle is plotted against the wave length and two completely symmetrical curves are clearly seen, one for the D-enantiomer and the other for the L-enantiomer.

The resolution was virtually complete and from a feed of 2 mg. two substantially equal fractions of about 1 mg. each were obtained.

Example 6

N-TFA-(±)-alanine-t-butyl ester was resolved over a stationary active phase consisting of N-TFA-(L-val)₂-isopropyl ester at different temperatures. The results are given in the diagram of FIG. 5 in which the resolution factor is plotted against the temperature and it is seen that the resolution factor drops with the raise of temperature.

Example 7

Using the same apparatus as in Example 1, the N-TFA derivatives of various straight chain and branched chain amines as well as 3-amino cyclenes were resolved into their enantiomers. The results are given in the following Table IV:

TABLE IV

[Retention Volume of N-TFA-(±)-Amines with an Optically Active Ureide as Stationary Phase 2-]

| n-Alkane | N-TFA-(±)ᵇ-amino-n-alkanes | | |
|---|---|---|---|
| | $V_R$ (min.)ᵇ | | |
| | Peak 1 | Peak 2 | $r_{2/1}$ᶜ |
| Butane | 5.53 | 5.68 | 1.027 |
| Pentane | 9.24 | 9.60 | 1.040 |
| Hexane | 16.0 | 16.75 | 1.049 |
| Heptane | 27.9 | 29.3 | 1.051 |
| Octane | 49.2 | 51.9 | 1.058 |
| Decane | 152.0 | 160.5 | 1.056 |

| | N-TFA-(±)-2-amino branched alkanes | | |
|---|---|---|---|
| | $r$ᵈ | | $r_{2/1}$ᶜ |
| 3-methyl-2-amino-butane | 3.29 | 3.40 | 1.033 |
| 3,3-dimethyl-2-amino-butane | 2.71 | 2.88 | 1.059 |

| | N-TFA-(±)-methylcyclohexyl amines | | |
|---|---|---|---|
| | $r$ᵉ | | $r_{2/1}$ᶜ |
| Ortho: | | | |
| Trans | 0.879 | 0.909 | 1.034 |
| Cis | 2.563 | 2.626 | 1.024 |
| Meta: | | | |
| Trans | 1.258 | 1.270 | 1.010 |
| Cis | 2.452 | 2.529 | 1.031 |
| Para: | | | |
| Trans | 136 } Symmetrical isomers | | |
| cis | 252 } | | |

| | N-TFA-(±)-3-amino cyclenes | | |
|---|---|---|---|
| | $r$ᵉ | | $r_{2/1}$ᶜ |
| Cyclohexene | 1.255 | 1.262 | 1.005 |
| Cycloheptene | 3.076 | 3.107 | 1.010 |
| Cyclooctene | 7.369 | 7.579 | 1.029 |

ᵃ Column: 70 m. x 0.25 mm. glass capillary coated with the condensation product of L-valine isopropyl ester and phosgene; temp. 120°.
ᵇ Corrected retention time.
ᶜ Ratio of the corrected retention volume of the second peak over the first peak.
ᵈ Retention volume relative to 2-heptyl acetate.
ᵉ Retention volume relative to n-decyl acetate.

We claim:

1. A process for the resolution of enantiomers having optical antipodes, said enantiomers being members of the group of compounds having an —NH— group linked to an asymmetric carbon atom or to an atom in α-position to an asymmetric carbon atom, comprising passing a vapourized mixture of enantiomers through a gas-liquid partition chromatography column whose stationary phase comprises at least one compound selected from the group consisting of:

(a) compounds with at least one asymmetric carbon atom of the general formula

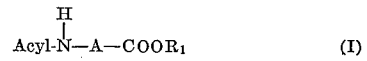

in which Acyl is an acyl radical, $R_1$ is the radical of an esterifying alcohol $R_1$OH and A is a radical formed from at least two pepticidally condensed amino acids which together with the terminal amino and carboxylic groups form a polypeptide of the formula NH₂—A—COOH;

(b) compounds with at least two asymmetric carbon atoms of the general formula

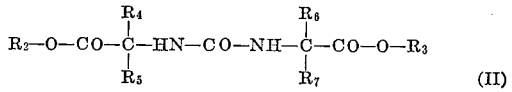

in which $R_2$ is the radical of an esterifying alcohol $R_2$OH, $R_3$ is the radical of an esterifying alcohol $R_3$OH, and each of $R_4$ through $R_7$ is a member selected from the group consisting of hydrogen, hydrocarbon radicals and substituted hydrocarbon radicals, with the proviso that $R_4$ is different from $R_5$ and $R_6$ is different from $R_7$;

(c) α-amino acid amides with at least one asymmetric carbon atom, said acid amide being optionally acylated at the amino or amido group; and separately recovering the optical antipodes emerging from the discharge end of the column.

2. A process according to claim 1, wherein a capillary column is used.

3. A process according to claim 2, wherein the column is conditioned prior to use by first producing on the inner walls thereof a continuous detergent film and depositing on the latter a continuous coat of the stationary active phase material.

4. A process according to claim 1, wherein a packed column is used.

5. A process according to claim 1, wherein said polypeptide derivative of Formula I is a member selected from the group consisting of N-acylated dipeptide esters and N-acylated tripeptide esters.

6. A process according to claim 1, wherein said compound of Formula II also corresponds to the formula

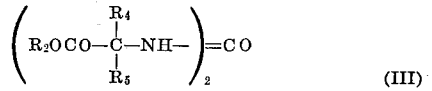

wherein $R_2$, $R_4$ and $R_5$ have the same meanings as in claim 1.

7. A process according to claim 1, wherein the enantiomers that are resolved are members selected from the group consisting of N-acylated amino acid esters.

8. A process according to claim 1, wherein the enantiomers are members selected from the group consisting of N-acylated-O-acylated amino alcohols.

9. A process according to claim 1, wherein the enantiomers are members selected from the group consisting of primary organic amines, N-substituted primary organic amines and secondary organic amines.

10. A process according to claim 1, wherein the enantiomers are members selected from the group consisting of heterocyclic compounds with a nuclear nitrogen atom in the form of an —NH— group.

References Cited

Gil-Av et al.; Separation of Enantiomers by Gas Liquid Chromatography with an Optically Active Stationary Phase, Tetrahedron Letters, Number 10, March 1966, pp. 1009–1015.

JAMES L. DECESARE, Primary Examiner